(12) United States Patent
Eyraud et al.

(10) Patent No.: US 10,677,329 B2
(45) Date of Patent: Jun. 9, 2020

(54) ELECTROMECHANICAL ACTUATOR CYLINDER

(71) Applicant: AKTIEBOLAGET SKF, Gothenburg (SE)

(72) Inventors: Emmanuel Eyraud, Cambéry (FR); Laurent Benoit, La Chavanne (FR)

(73) Assignee: Aktiebolaget SKF, Gothenburg (SE)

( * ) Notice: Subject to any disclaimer, the term of this patent is extended or adjusted under 35 U.S.C. 154(b) by 665 days.

(21) Appl. No.: 15/272,761

(22) Filed: Sep. 22, 2016

(65) Prior Publication Data
US 2017/0089436 A1 Mar. 30, 2017

(30) Foreign Application Priority Data

Sep. 24, 2015 (FR) .................................... 15 59018

(51) Int. Cl.
*F16H 25/22* (2006.01)
*F16C 33/58* (2006.01)
*F16C 19/18* (2006.01)
*H02K 7/06* (2006.01)
*H02K 7/08* (2006.01)
*F16C 19/54* (2006.01)
*F16H 25/20* (2006.01)

(52) U.S. Cl.
CPC ....... *F16H 25/2247* (2013.01); *F16C 19/183* (2013.01); *F16C 33/581* (2013.01); *F16H 25/22* (2013.01); *H02K 7/06* (2013.01); *H02K 7/083* (2013.01); *F16C 19/54* (2013.01); *F16C 2380/26* (2013.01); *F16H 25/2204* (2013.01); *F16H 25/2252* (2013.01); *F16H 2025/2075* (2013.01)

(58) Field of Classification Search
CPC . F16H 25/2247; F16H 25/2252; F16C 33/581
See application file for complete search history.

(56) References Cited

U.S. PATENT DOCUMENTS 6,098,479 A * 8/2000 Hoermansdoerfer ........................
B60T 13/741
475/333
6,325,180 B1 12/2001 De Vries et al.
(Continued)

FOREIGN PATENT DOCUMENTS

CN 1262726 A 8/2000
CN 102066762 A 5/2011
(Continued)

*Primary Examiner* — William Kelleher
*Assistant Examiner* — Gregory T Prather
(74) *Attorney, Agent, or Firm* — Laurence A. Greenberg; Werner H. Stemer; Ralph E. Locher

(57) ABSTRACT

The electromechanical actuator cylinder provides a casing, an actuation rod mounted to be movable longitudinally relative to the casing, an electric motor provided with a stator and with a rotating rotor shaft, and a mechanism for converting a rotational movement of the rotor shaft into a linear movement in translation of the actuation rod. The actuator cylinder includes at least one roller bearing for guiding the rotor shaft in rotation relative to the casing and providing at least one row of rolling elements. An inner raceway for the row of rolling elements of the bearing is formed directly on the rotor shaft.

10 Claims, 3 Drawing Sheets

(56) References Cited

U.S. PATENT DOCUMENTS

| | | | | |
|---|---|---|---|---|
| 2002/0172733 A1* | 11/2002 | Takanohashi | ........... | B29C 45/83 |
| | | | | 425/107 |
| 2004/0055404 A1* | 3/2004 | Mills | ........ | F16H 61/32 |
| | | | | 74/337.5 |
| 2006/0214453 A1* | 9/2006 | Gerhardt | ............ | F16H 25/2247 |
| | | | | 296/57.1 |
| 2009/0100957 A1* | 4/2009 | Winkel | ................. | B64G 1/283 |
| | | | | 74/5 R |
| 2011/0007408 A1* | 1/2011 | Kurosawa | .............. | G02B 7/102 |
| | | | | 359/824 |
| 2014/0167539 A1* | 6/2014 | Neuhaus | ................ | H02K 5/161 |
| | | | | 310/80 |
| 2015/0308549 A1* | 10/2015 | Hirai | ..................... | F16H 25/205 |
| | | | | 74/89.29 |
| 2017/0067455 A1* | 3/2017 | Reukers | .................. | F04B 1/02 |

FOREIGN PATENT DOCUMENTS

| | | | | |
|---|---|---|---|---|
| CN | 104675946 A | 6/2015 | | |
| CN | 204646984 U | 9/2015 | | |
| EP | 2148413 A1 * | 1/2010 | ............. | F16D 65/14 |
| WO | 2015127497 A1 | 9/2015 | | |

\* cited by examiner

ELECTROMECHANICAL ACTUATOR CYLINDER

CROSS REFERENCE TO RELATED APPLICATIONS

This application claims priority to French patent application no. 1559018 filed on Sep. 24, 2015, the contents of which are fully incorporated herein by reference.

FIELD OF THE INVENTION

The present invention relates to the field of electromechanical actuators or actuator cylinders.

BACKGROUND OF THE INVENTION

More particularly, the invention relates to the field of compact electromechanical actuator cylinders used to provide high performance with a reduced overall size.

An electromechanical actuator cylinder generally provides a casing, an actuation rod mounted so as to be movable longitudinally relative to the casing, an electric motor, and a mechanism, for example of the ball screw type, for converting the rotational movement of the rotor of the motor into a linear movement in translation of the actuation rod.

In order to guide in rotation and support the rotor of the electric motor, a pair of roller bearings mounted axially in abutment against one another is generally mounted at the front of the casing.

This axial stacking of bearings is usually mounted on one side against a radial stop formed on the shaft of the rotor and is axially prestressed by a self-locking clamping nut arranged on the other side.

This solution has the disadvantages in particular of having a considerable axial bulk and of requiring a large number of operations to provide the mounting and fixing of the roller bearings inside the casing of the actuator cylinder.

The present invention aims to overcome these disadvantages.

BRIEF SUMMARY OF THE INVENTION

More particularly, the present invention aims to provide an electromechanical actuator cylinder in which, with the same axial bulk, the loading capacity is increased.

In one embodiment an electromechanical actuator cylinder provides a casing, an actuation rod mounted so as to be movable longitudinally relative to the casing, an electric motor provided with a stator and a rotating rotor shaft, and a mechanism for converting a rotational movement of the rotor shaft into a linear movement in translation of the actuation rod.

The actuator cylinder also provides at least one roller bearing for guiding the rotor shaft in rotation and comprising at least one row of rolling elements. An inner raceway for the row of rolling elements is formed directly on the rotor shaft.

The rolling elements of the bearing roll directly over the rotor shaft of the electric motor supporting the magnets. This bearing is therefore devoid of an inner ring disposed radially between the rolling elements and the rotor shaft.

Thus, in contrast to the prior art, it is not necessary to provide specific means to assure the axial blocking of this bearing or these bearings on the rotor shaft. It is therefore possible to mount an electric motor of greater length within the casing. This makes it possible to increase the loading capacity of the actuator cylinder whilst maintaining the same overall axial bulk. By contrast, for the same loading capacity, it is possible to reduce the overall axial bulk of the actuator cylinder.

The inner raceway is preferably formed on an outer surface of the rotor shaft.

The roller bearing can provide an outer ring mounted in a bore in the casing and provided with an outer raceway for the row of rolling elements of the bearing.

In a preferred embodiment, the actuator cylinder provides at least two roller bearings mounted axially in contact with one another and each comprising a row of rolling elements, an inner raceway for each of the rows of rolling elements being formed directly on the rotor shaft. The rows of rolling elements of the bearings are arranged in an X shape.

In one embodiment the bearing or bearings can be of the angular contact ball bearing type.

The conversion mechanism is preferably a roller screw or ball screw mechanism.

In a variant, the mechanism provides a screw connected to the actuation rod and provided with an external thread, and a plurality of longitudinal rollers engaged with the external thread of the screw and an internal thread of the rotor shaft.

In another variant the roller screw mechanism provides a screw provided with an external thread, a nut disposed around the screw, comprising an internal thread and connected to the actuation rod, and a plurality of longitudinal rollers engaged with the external and internal threads of the screw and the nut. Alternatively, with replacement of the rollers, balls can be engaged with the external and internal threads of the screw and the nut.

BRIEF DESCRIPTION OF THE SEVERAL VIEWS OF THE DRAWING

The present invention will be better understood upon reading the following detailed description of embodiments, which are provided by way of non-limiting example and illustrated by the accompanying drawings.

DETAILED DESCRIPTION OF THE INVENTION

Figure 1:
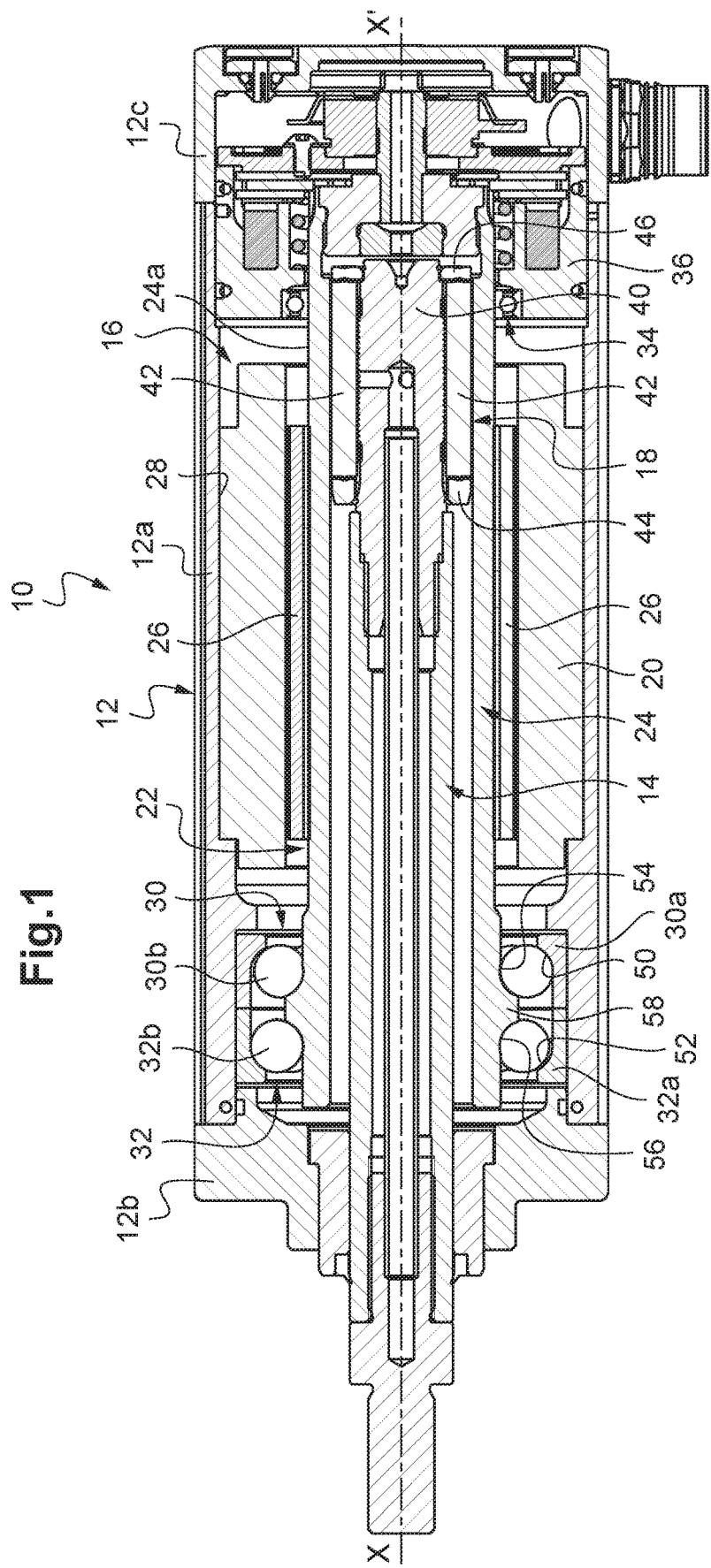
FIG. 1 is an axial sectional view of an electromechanical actuator cylinders in accordance with a first exemplary embodiment of the present invention.

In FIG. 1 the electromechanical actuator cylinder, referenced 10 as a whole, extends along a longitudinal axis X-X', which is intended to be horizontal. The actuator cylinder 10 provides a casing 12, an actuation rod 14 movable axially and coaxially to the axis X-X', and also an electric motor 16 and a roller screw mechanism 18 disposed inside the casing 12. The mechanism 18 is disposed radially between the electric motor 16 and the actuation rod 14.

The mechanism 18 allows the conversion of a rotational movement of the electric motor 16 and a linear movement in translation of the actuation rod 14 along the axis X-X'. The electric motor 16 and the mechanism 18 are housed entirely within the casing 12. The actuation rod 14 extends through the casing 12 and protrudes axially to the outside.

In the illustrated exemplary embodiment the casing 12 provides a tubular main body 12*a* and front 12*b* and rear 12*c* flanges, each mounted at one end of the body. The actuation rod 14 extends through the front flange 12*b*.

The electric motor 16 provides a stator 20 fixed on the casing 12 and a rotor 22. The stator 20 is fixed on a bore 28 in the casing. The rotor 22 is provided with a tubular rotor shaft 24 and a plurality of permanent magnets 26 supported by the shaft. The rotor shaft 24 extends axially on either side of the stator 20. The electric motor 16 can be of the brushless type.

In order to guide in rotation and support the rotor shaft 24, the actuator cylinder 10 also provides two front roller bearings 30, 32 and one rear roller bearing 34. As will be described in greater detail hereinafter, the bearings 30, 32 are each designed so as to limit the overall axial bulk of the actuator cylinder 10.

The rear roller bearing 34 is disposed radially between the rotor shaft 24 and a rear support 36 fixed in the bore 28 in the casing. The roller bearing 34 is mounted on an outer surface 24*a* of the rotor shaft and in a rear bore in the support 36. In addition, sensor and coding means are disposed inside the rear flange 12*c* of the casing in order to know the angular position of the rotor 22 of the electric motor.

In the illustrated exemplary embodiment the roller screw mechanism 18 is of the inverted planetary roller screw type. The mechanism 18 provides a screw 40, which is coaxial to the actuation rod 14, fixed to the rod and provided with an external thread (not referenced), and a plurality of longitudinal rollers 42 disposed radially between the screw and the rotor shaft 24. The rotor shaft 24 has a tubular form. The rotor shaft 24, coaxial to the screw 40, provides an internal thread (not referenced) of which the inner diameter is greater than the outer diameter of the thread of the screw 40.

The rollers 42 are identical to one another and are distributed uniformly around the screw 40. Each roller 42 extends along an axis parallel to the axis of the screw and provides an external thread (not referenced) engaged with the external thread of the screw 40 and the internal thread of the rotor shaft 24. As is known per se, each roller 42 provides, at each end, an outer toothing engaged with a synchronization toothing of the screw 40, and a journal extending axially to the outside from the toothing and housed in a recess in one of the spacer rings 44, 46 mounted on the screw.

The actuation rod 14 is connected to the screw 40 of the roller screw mechanism. The rotation of the rotor shaft 24 of the electric motor is converted into a translation of the screw 40 and of the actuation rod 14 along the axis X-X'.

As indicated before, the roller bearings 30, 32 assure the guidance in rotation of the rotor shaft 24 of the electric motor. Each bearing 30, 32 provides an outer ring 30*a*, 32*a* and a plurality of rolling elements 30*b*, 32*b*, provided here in the form of balls, which are disposed radially between the inner ring and the rotor shaft 24. Each bearing 30, 32 also provides a cage (not shown) for maintaining regular circumferential spacing of the rolling elements.

The outer ring 30*a*, 32*a* of each bearing is fixed in the bore 28 in the casing. An outer raceway 50, 52 is formed on the bore of each ring and has, in cross-section, a concave inner profile adapted to the rolling elements 30*b*, 32*b*, the raceway being directed radially inwardly.

An inner raceway 54, 56 is formed directly on the outer surface 24*a* of the rotor shaft for the row of rolling elements 30*b*, 32*b* of each bearing 30, 32. The outer surface 24*a* of the rotor shaft delimits the pathways for the rolling elements. Each raceway 54, 56 has, in cross-section, a concave inner profile adapted to the rolling elements 30*b*, 32*b*, the raceway being directed radially outwardly.

The raceways 54, 56 are formed on a radial protrusion 58 of the rotor shaft 24. The protrusion 58 extends radially outwardly from the outer surface 24*a* of the rotor shaft and is situated axially between the two rows of rolling elements 30*b*, 32*b*. The protrusion 58 is formed integrally with the rotor shaft 24, i.e. in one piece. In the illustrated exemplary embodiment the rolling elements 30*b*, 32*b* are disposed in an X shape.

The rolling elements 30*b*, 32*b* are in direct contact with the outer surface 24*a* of the rotor shaft. Each bearing 30, 32 is therefore devoid of an inner ring disposed radially between the rotor shaft 24 and the rolling elements 30*b*, 32*b*.

Thus, by contrast with the prior art, it is not necessary to provide specific means in order to assure the axial stop of the bearings 30, 32 on the rotor shaft 24. It is therefore no longer obligatory to provide an axial space on the rotor shaft 24 dedicated specifically to the assembly of such means. Thus, it is now possible to mount an electric motor 16 of greater length and to therefore increase the loading capacity of the actuator cylinder 10, whilst maintaining the same overall axial bulk.

Figure 2:
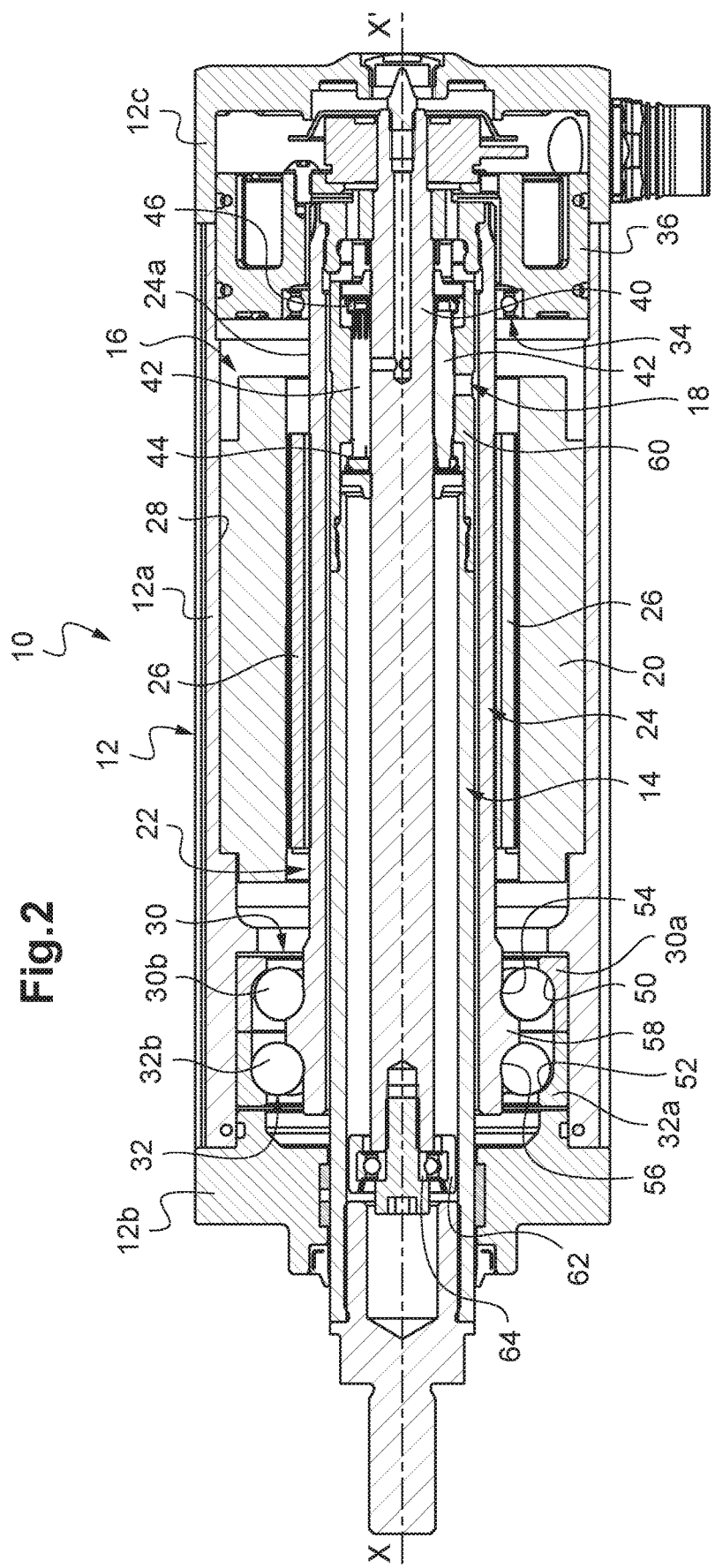
FIG. 2 is an axial sectional view of an electromechanical actuator cylinders in accordance with a second exemplary embodiment of the present invention.

The exemplary embodiment illustrated in FIG. 2, in which identical elements carry the same references, differs from the previous example primarily in that the mechanism 18 is of the planetary roller screw type. The mechanism 18 provides a nut 60, which is mounted inside the tubular rotor shaft 24 of the electric motor and on which the actuation rod 14 is fixed. In this example the actuation rod 14 is therefore connected to the nut 60.

The nut 60 is mounted coaxially to the screw 40 and provides an internal thread (not referenced) of which the inner diameter is greater than the outer diameter of the thread of the screw. The rollers 42 are disposed here radially between the nut 60 and the screw 40 and are engaged with the internal and external threads of the nut and of the screw.

The screw 40 of the mechanism is coupled here to the rotor shaft 24 of the electric motor. The screw 40 extends inside the tubular actuation rod 14. In order to assure the guidance in rotation of the screw 40, the actuator cylinder 10 provides a housing 62 provided with a roller bearing 64 and disposed radially between the screw and the bore in the actuation rod 14.

In this exemplary embodiment the rotation of the screw 40 of the mechanism 18, which is connected to the rotor shaft 24, is converted into a translation of the nut 60 and of the actuation rod 14 along the axis X-X'.

Figure 3:
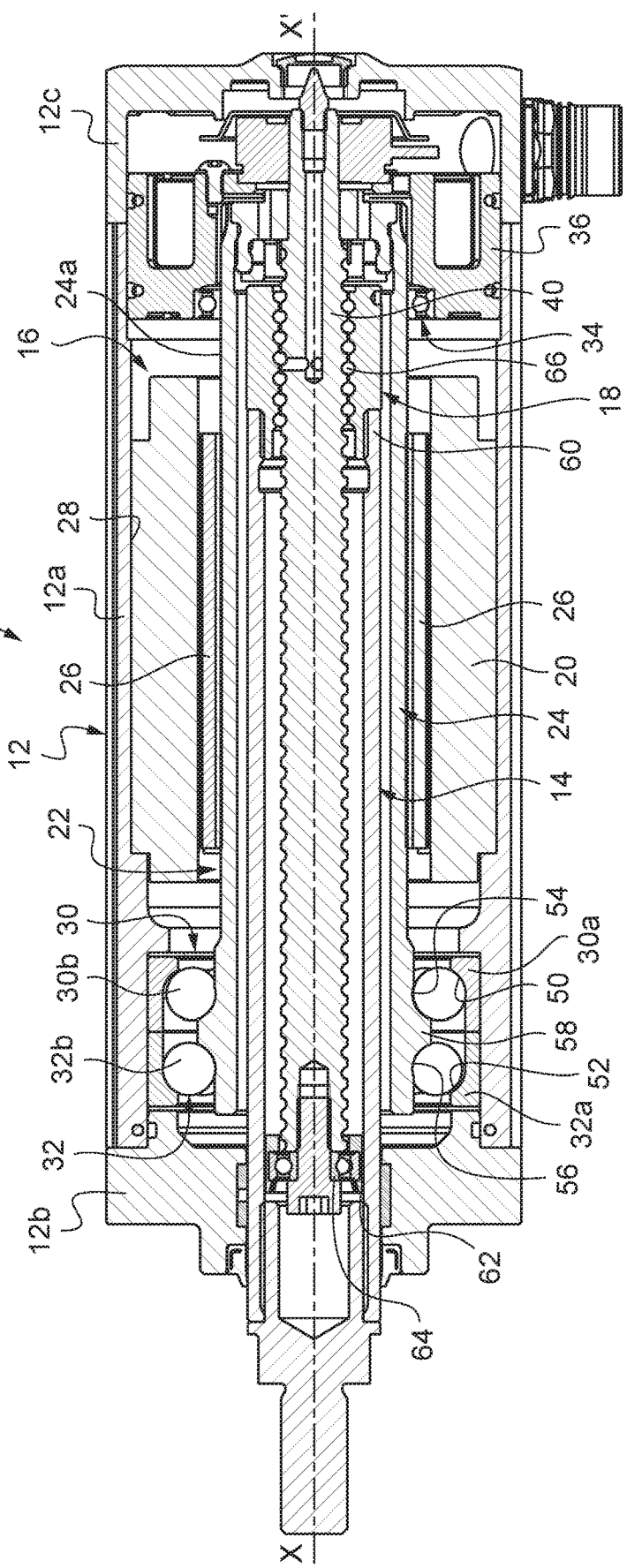
FIG. 3 is an axial sectional view of an electromechanical actuator cylinder in accordance with a third exemplary embodiment of the present invention.

The previous exemplary embodiments relate to an actuator cylinder provided with a mechanism 18 of the roller screw type. Alternatively, the actuator cylinder 10 may provide a ball screw mechanism as is illustrated in FIG. 3, in which identical elements carry the same references.

Compared with the previously described exemplary embodiment, the actuator cylinder 10 differs solely in that the mechanism 18 provides a plurality of balls 66 engaged within the external and internal threads of the screw 40 and of the nut 60 which are provided specifically for this purpose. Means for recirculating the balls (not shown) are also provided on the nut 60.

The invention has been illustrated on the basis of an actuator cylinder comprising bearings 30, 32 of the angular contact ball bearing type. Alternatively, it could be possible to provide other types of rolling elements, for example rollers.

In the illustrated exemplary embodiment, the rolling elements are arranged in an X shape. Alternatively, it could be possible to provide an arrangement in an O shape. However, for reasons of assembly, the inner raceway of one of the two bearings is formed directly on the rotor shaft in this case, the other bearing being provided with its own inner ring.

The invention has been presented on the basis of an actuator cylinder comprising bearings mounted axially in abutment against one another and each comprising a sole row of rolling elements. In a variant, it could be possible for examples to provide a sole bearing comprising at least two rows of rolling elements, or even a greater number of bearings stacked axially and comprising one or more rows of rolling elements.

The invention claimed is:

1. An electromechanical actuator cylinder comprising:
   a casing,
   an actuation rod mounted to be movable longitudinally relative to the casing,
   an electric motor provided with a stator and a rotor, the rotor having a rotating rotor shaft extending axially on either side of the stator and a plurality of permanent magnets supported by the rotor shaft in a section radially within the stator,
   a mechanism for converting a rotational movement of the rotor shaft into a linear movement in translation of the actuation rod, and
   at least one roller bearing for guiding the rotor shaft in rotation relative to the casing and having at least one row of first rolling elements, an inner raceway for the row of first rolling elements being formed directly by the rotor shaft so that that the first rolling elements are in direct contact with the rotor shaft, wherein
   the mechanism for converting includes a screw provided with an external thread, a nut disposed around the screw, the nut having an internal thread and being connected to the actuation rod, and a plurality of second rolling elements engaged with the external thread and with the internal thread.

2. The actuator cylinder as claimed in claim 1, wherein the inner raceway is formed on an outer surface of the rotor shaft.

3. The actuator cylinder as claimed in claim 1, wherein the at least one roller bearing comprises an outer ring mounted in a bore in the casing, the outer ring providing an outer raceway for the row of first rolling elements.

4. The actuator cylinder as claimed in claim 1, wherein the at least one roller bearing comprises at least two roller bearings mounted axially in contact with one another and each having a row of the first rolling elements, an inner raceway for each row of the first rolling elements being formed directly on the rotor shaft.

5. The actuator cylinder as claimed in claim 1, wherein the at least one roller bearing is an angular contact ball bearing.

6. The actuator cylinder as claimed in claim 1, wherein the second rolling elements are rollers.

7. The actuator cylinder as claimed in claim 1, wherein the second rolling elements are balls.

8. An electromechanical actuator cylinder comprising:
   a casing,
   an actuation rod mounted to be movable longitudinally relative to the casing,
   an electric motor provided with a stator and a rotor, the rotor having a rotating rotor shaft extending axially on either side of the stator and a plurality of permanent magnets supported by the rotor shaft in a section radially within the stator,
   conversion means for converting a rotational movement of the rotor shaft into a linear movement of the actuation rod, and
   at least one roller bearing for guiding the rotor shaft in rotation relative to the casing and having at least one row of rolling elements, an inner raceway for the row of rolling elements being formed directly by the rotor shaft so that that the first rolling elements are in direct contact with the rotor shaft.

9. The actuator according to claim 8, wherein the conversion means includes a roller screw.

10. The actuator according to claim 8, wherein the conversion means includes a ball screw.

* * * * *